United States Patent [19]
Bailey

[11] Patent Number: 5,802,846
[45] Date of Patent: Sep. 8, 1998

[54] EXHAUST GAS RECIRCULATION SYSTEM FOR AN INTERNAL COMBUSTION ENGINE

[75] Inventor: Brett M. Bailey, Peoria, Ill.

[73] Assignee: Caterpillar Inc., Peoria, Ill.

[21] Appl. No.: 828,685

[22] Filed: Mar. 31, 1997

[51] Int. Cl.⁶ .............. F01N 3/02; F02M 25/07; F02B 33/44
[52] U.S. Cl. .............. 60/278; 60/605.2; 123/570
[58] Field of Search .................. 123/568, 569, 123/570, 571; 60/278, 279, 605.2, 606, 320

[56] References Cited

U.S. PATENT DOCUMENTS

| | | | |
|---|---|---|---|
| 3,776,207 | 12/1973 | Simko | 123/570 |
| 4,041,698 | 8/1977 | Moritz | 60/39.52 |
| 4,109,625 | 8/1978 | Kawamura et al. | 123/570 |
| 4,156,414 | 5/1979 | Kawamura et al. | 123/570 |
| 4,170,112 | 10/1979 | Bessho | 60/278 |
| 4,198,940 | 4/1980 | Ishida | 123/568 |
| 4,233,811 | 11/1980 | Masaki | 60/278 |
| 4,284,056 | 8/1981 | Sugasawa | 123/568 |
| 4,426,848 | 1/1984 | Stachowicz | 60/605 |
| 4,969,445 | 11/1990 | Hertweck et al. | 123/569 |
| 5,226,401 | 7/1993 | Clarke et al. | 123/571 |
| 5,271,221 | 12/1993 | Lyon | 60/278 |
| 5,456,240 | 10/1995 | Kanesaka | 123/565 |
| 5,517,976 | 5/1996 | Bachle et al. | 123/570 |
| 5,617,726 | 4/1997 | Sheridan et al. | 123/570 |
| 5,669,365 | 9/1997 | Gartner et al. | 123/570 |

*Primary Examiner*—Willis R. Wolfe
*Attorney, Agent, or Firm*—Robert J. Hampsch

[57] ABSTRACT

A constant rate exhaust gas recirculation (EGR) system for a pressure-charged internal combustion engine is provided. The disclosed exhaust gas recirculation system includes one or more exhaust gas diversion ports, one or more EGR diversion valves each of which is operatively associated with a selected combustion chamber for diverting a flow of exhaust gas from the selected combustion chambers via an exhaust gas recirculation conduit to the intake air circuit of the pressure-charged internal combustion engine. The disclosed embodiment of the constant rate EGR system also includes a bypass conduit for diverting a flow of intake air to the exhaust manifold and an EGR cooler disposed in operative association with the recirculation conduit and the bypass conduit and adapted for cooling the volume of recirculated exhaust gas in the recirculation conduit while concurrently heating the intake air in the bypass conduit.

17 Claims, 2 Drawing Sheets

EXHAUST GAS RECIRCULATION SYSTEM FOR AN INTERNAL COMBUSTION ENGINE

FIELD OF THE INVENTION

The present invention relates to an exhaust gas recirculation (EGR) system for a pressure-charged internal combustion engine, and more particularly to a constant rate exhaust gas recirculation system that operates independently of engine speed, load, or inlet and exhaust temperatures and pressures.

BACKGROUND

Exhaust gas recirculation is a technique commonly used for controlling the generation of undesirable pollutant gases and particulate matter in the operation of internal combustion engines. This technique has proven particularly useful in internal combustion engines used in motor vehicles such as passenger cars, light duty trucks, and other on-road motor equipment. The exhaust gas recirculation technique primarily involves the recirculation of exhaust gas by-products into the intake air supply of the internal combustion engine. This exhaust gas thus reintroduced to the engine cylinder reduces the concentration of oxygen therein, which in turn lowers the maximum combustion temperature within the cylinder and slows the chemical reaction of the combustion process, decreasing the formation of nitrous oxide. Furthermore, the exhaust gases typically contain a portion of unburned hydrocarbon which is burned on its reintroduction into the engine cylinder, which further reduces the emission of exhaust gas by-products which would be emitted as undesirable pollutants from the internal combustion engine.

When utilizing EGR in a turbocharged diesel engine, the exhaust gas to be recirculated is preferably removed upstream of the exhaust gas driven turbine associated with the turbocharger. In many EGR applications, the exhaust gas is diverted directly from the exhaust manifold. Likewise, the recirculated exhaust gas is preferably re-introduced to the intake air stream downstream of the compressor and air-to-air aftercooler. Reintroducing the exhaust gas downstream of the compressor and air-to-air aftercooler is preferred due to the reliability and maintainability concerns that arise should the exhaust gas is passed through the compressor and aftercooler. However at some engine operating conditions, there is a pressure differential between the intake manifold and the exhaust manifold which essentially prevents many conventional EGR systems from being utilized. For example, at high speed, high load conditions in a turbocharged engine, the exhaust gas does not readily flow from the exhaust manifold to the intake manifold. What is needed, therefore, is a simple and inexpensive technique for recirculating a constant rate or flow of exhaust gas to the intake manifold at all engine operating conditions. In addition, the constant rate exhaust gas recirculation should be capable of operating independently of engine speed, load, or inlet and exhaust temperatures and pressures.

There are various related art EGR systems that are adapted to provide a constant rate EGR flow. See, for example, U.S. Pat. Nos. 3,776,207 (Simko) and 4,041,698 (Moritz). The constant rate EGR system disclosed in the Moritz patent achieves the constant EGR rate by means of a combustion air blower. On the other hand, the EGR system disclosed in the Simko patent teaches a constant rate EGR system wherein all exhaust gases from a predetermined number of the cylinders are directed to the intake system of an engine. Disadvantageously, the EGR system disclosed in the Simko patent teaches that such a system is operable only for a limited range of operating conditions (i.e. low load operation) and is not suitable for use in high load operations.

There are also various related art systems, such as U.S. Pat. Nos. 4,284,056 (Sugasawa) and 4,198,940 (Ishida) where the exhaust gases are recirculated through inactive cylinders. Disadvantageously, the EGR systems disclosed in the Sugasawa and Ishida patents are likewise not suitable for operating in all engine load conditions. Other related art systems include the EGR system disclosed in U.S. Pat. No. 5,226,401 (Clarke) wherein a selected subset of the combustion chambers operate in a reverse flow mode thus recirculating exhaust gas from the exhaust manifold to the intake manifold.

Another problem associated with many conventional EGR systems is that the turbocharger efficiency is often sacrificed when exhaust gas is diverted from the exhaust manifold. Removing the exhaust gas to be recirculated from the exhaust manifold or elsewhere upstream of the exhaust gas driven turbine depletes the mass flow and heat energy passing through the turbine which, in turn, lowers the boost levels created by the compressor. Most diesel engine turbochargers are fixed geometry turbochargers, in that they are specifically designed to operate efficiently when matched to the engine exhaust flow output. The reduction in mass flow and pressure due to the EGR creates a mismatch between the exhaust flow to the turbocharger and the turbine specifications during EGR operation. The mismatch results in a turbocharger output that is reduced in percentage more than the percentage reduction in exhaust flow to the turbocharger thereby creating significant losses in airflow and boost pressure. The reduction in airflow and boost pressure decreases the air to fuel ratio down to a point where particulates as well as the brake specific fuel consumption (BSFC) increase. Disadvantageously, the reduction in airflow and boost pressure also results in a noticeable difference in engine performance to the operator depending on whether EGR is on or off.

Yet another problem encountered in many EGR systems is that particulates in the EGR system build up in the valves and EGR coolers creating an EGR flow restriction and corresponding pressure loss. If the particulate build up is too severe, the emissions of the engine suffers over the course of engine life. What is needed, therefore, is an EGR system wherein the particulate build up in valves and EGR coolers and corresponding pressure loss is minimized.

SUMMARY OF THE INVENTION

The present invention addresses the above and other needs by providing a method and system for exhaust gas recirculation (EGR) in a pressure charged internal combustion engine, preferably a turbocharged diesel engine. The present EGR system provides for the complete diversion of exhaust gas from a selected number of combustion chambers to the intake air circuit of engine. In this manner, the EGR system takes advantage of the positive displacement pumping action of the engine cylinders to flow the exhaust from the selected combustion chambers against the restrictions in the EGR path as well as overcoming the higher intake manifold pressures.

In one aspect, the invention may be characterized as a constant rate exhaust gas recirculation (EGR) system for a pressure-charged internal combustion engine including one or more exhaust gas diversion valves each of which is in flow communication with a selected combustion chamber for diverting a flow of exhaust gas from the selected combustion chambers via an exhaust gas recirculation conduit. The exhaust gas recirculation conduit transports or diverts the flow of exhaust gas from the selected combustion chambers to the intake air circuit of the pressure-charged internal combustion engine and preferably to a location downstream of the intake air pressurizing device. The exhaust gas diversion valves are operatively associated with a controller which selectively diverts said flow of exhaust gas from each of the selected combustion chambers to said exhaust gas recirculation conduit or allows the exhaust gas from each of the selected combustion chambers to flow to the exhaust manifold. The present embodiment of the EGR system uses a simplified control strategy in that the percentage of exhaust gas recirculated is independent of different engine speeds, engine loads, air massflow, turbocharger backpressure temperature or pressure. Rather, the percent of the exhaust gas recirculated in the presently disclosed embodiment is controlled simply by the number of cylinders diverted relative to the number of total engine cylinders.

The invention may also be characterized as a method for recirculating exhaust gas in a pressure-charged internal combustion engine. The disclosed method comprises the steps of: diverting a flow of exhaust gas from a selected number of combustion chambers to a recirculation conduit; transporting said diverted flow in said recirculation conduit to said intake air circuit at a location downstream of said intake air pressurizing device and upstream of said intake manifold; and replacing said diverted flow of exhaust gas in said exhaust manifold with a flow of replacement air. The flow of replacement air is preferably a diverted flow of intake air.

The disclosed method of recirculating exhaust gas further includes the optional yet advantageous steps of cooling said recirculated exhaust gas in said recirculation conduit using said flow of diverted intake air and concurrently heating said diverted intake air using said recirculated exhaust gas. In the preferred embodiment, the heated intake air along with any remaining exhaust gas in the exhaust manifold is then directed to the exhaust gas driven turbine of the turbocharger. In this manner, the losses in the turbocharger speed due to the exhaust gas recirculation are minimized.

Accordingly, an important aspect of the disclosed invention is the complete diversion of exhaust gas from a selected number of combustion chambers to the intake air circuit of engine. In this manner, the EGR system takes advantage of the positive displacement pumping action of the engine cylinders to flow the exhaust from the selected combustion chambers against the restrictions in the EGR path as well as overcoming the higher intake manifold pressures. In addition, the complete diversion of exhaust gas from one or more combustion chamber provides a simplified EGR control strategy that is independent of different engine speeds, engine loads, or inlet and exhaust temperatures and pressures.

Another advantageous feature of the disclosed embodiment of the EGR system and associated process is the use of a bypass conduit for selectively transporting a flow of intake air from said intake circuit to said exhaust manifold to replace said recirculated exhaust gas. In addition, an EGR cooler is preferably disposed in operative association with the recirculation conduit and the bypass conduit. The EGR cooler is adapted for cooling the volume of recirculated exhaust gas in the recirculation conduit while concurrently heating the intake air in the bypass conduit. The use of intake air to cool the recirculating exhaust gases eliminates the need to use the engine coolant to absorb the heat rejection from the recirculating exhaust gases. In addition, the use of intake air to cool the recirculating exhaust gases thus avoids or minimizes pumping losses incurred in many related art systems where jacket water flows through the EGR cooler.

Yet another advantageous feature of the disclosed invention is the use of the recirculated exhaust gases to heat the diverted intake air. This heated intake air is routed to the turbocharger or other intake air pressurizing device along with the non-recirculated exhaust gases present in the exhaust manifold. Directing both the heated intake air and non-recirculated exhaust gases to the turbocharger allows the standard, fixed geometry turbochargers to operate at a more efficient temperature, pressure and air mass flow. The more efficient operation of the turbocharger during EGR operations allows for the improvement of the air to fuel ratio at high engine loads and permits the use of EGR at engine operating conditions that many related art EGR systems have avoided. Moreover, the presently disclosed embodiment of the EGR system facilitates the use of EGR at high engine loads and allows for rapid transient response of a turbocharger. In other words, the turbocharger speed will remain high during EGR operation thus allowing quick response time when switching from EGR operation to non-EGR operation.

BRIEF DESCRIPTION OF THE DRAWINGS

The above and other aspects, features, and advantages of the present invention will be more apparent from the following, more descriptive description thereof, presented in conjunction with the following drawings, wherein.

Corresponding reference numbers indicate corresponding components throughout the several embodiments depicted in the drawings.

DETAILED DESCRIPTION OF THE INVENTION

The following description is of the best mode presently contemplated for carrying out the invention. This description is not to be taken in a limiting sense, but is made merely for the purpose of describing the general principals of the invention. The scope and breadth of the invention should be determined with reference to the claims.

Figure 1:
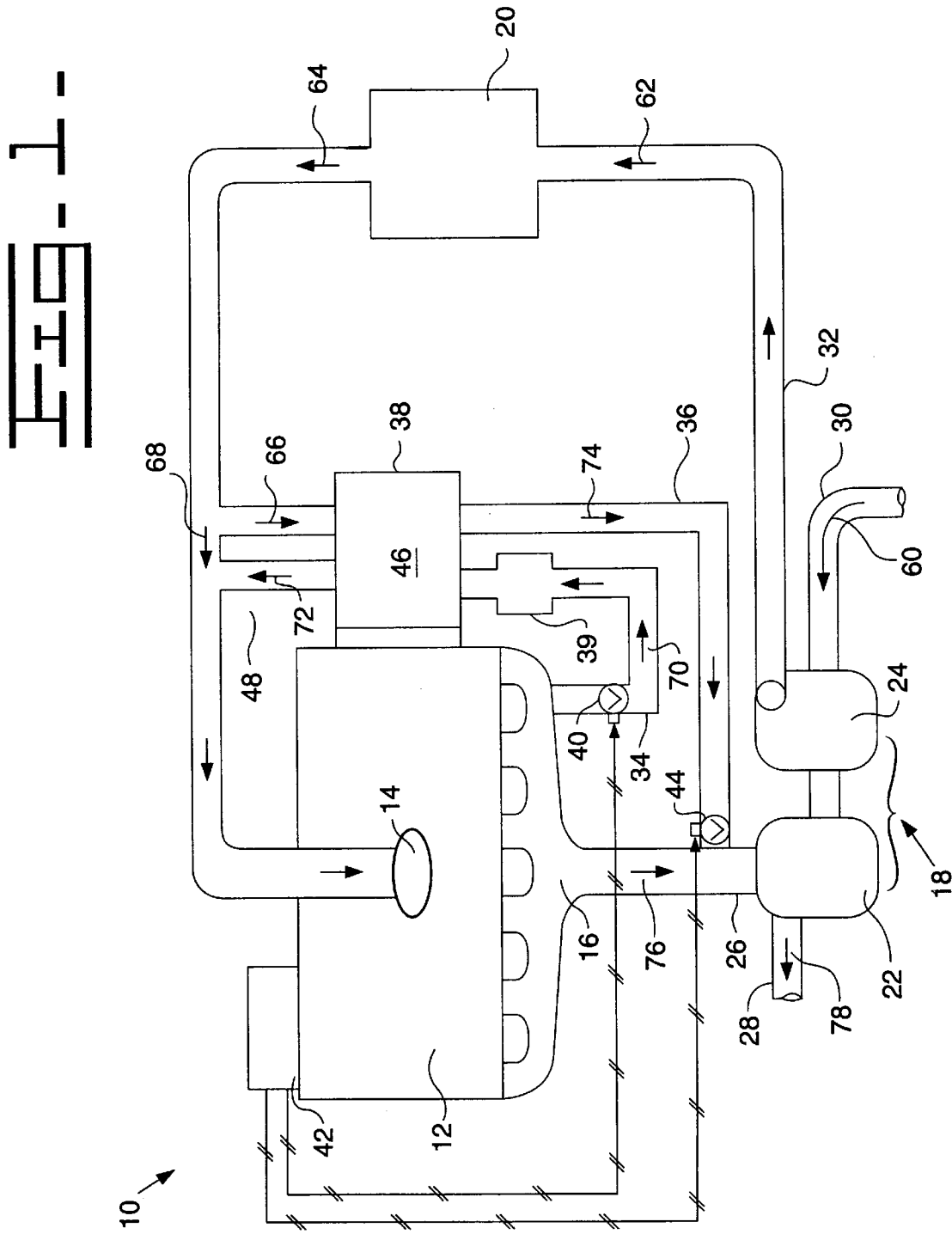
FIG. 1 is a schematic representation of the exhaust gas recirculation (EGR) system for a turbocharged engine in accordance with the present invention.

Turning now to the drawings and particularly to FIG. 1 there is shown a schematic representation of an exhaust gas recirculation (EGR) system 10 for a turbocharged compression ignition engine 12 (i.e. diesel engine). As seen therein, the turbocharged compression ignition engine 12 includes an intake manifold 14, exhaust manifold 16, a turbocharger 18, and an air-to-air aftercooler 20. The turbocharger 18 is preferably a fixed geometry turbocharger having an exhaust gas driven turbine 22 coupled to an intake air compressor 24. The turbocharger 18 also includes an exhaust gas inlet 26 and an exhaust gas outlet 28 both in fluid communication with the exhaust gas driven turbine 22. The turbocharger 18 further includes a fresh intake air conduit 30 and a compressed air exit conduit 32 both of which are in fluid communication with the air compressor 24.

In the preferred embodiment, the EGR system 10 includes an EGR conduit 34, an intake air bypass conduit 36, an EGR cooler 38 or heat exchanger, and an optional particulate trap 39. As seen in FIG. 1, the EGR conduit 34 is disposed in fluid communication with a select number of combustion chambers and is adapted for diverting a flow of exhaust gas from the selected combustion chambers to a position downstream of the turbocharger 18 and air-to-air aftercooler 20 and proximate the intake manifold 14. The diverted flow of exhaust gas from the selected combustion chambers via the EGR conduit 34 is controlled using one or more EGR diversion valves 40 operatively associated with an engine controller 42 or similar such engine control module.

The illustrated EGR system 10 also includes the intake air bypass conduit 36 for diverting a flow of cooled, compressed intake air from a position downstream of the turbocharger 18 and air-to-air aftercooler 20 to the exhaust manifold 16. The diverted flow of cooled, compressed intake air within the bypass conduit 42 is likewise controlled using a bleed air valve 44 operating under the control of the engine controller 42.

In the illustrated embodiment, the EGR cooler 38 is a counterflow air to EGR heat exchanger. The illustrated EGR cooler 38 is adapted to receive a hot EGR input flow from the selected combustion chambers via the EGR conduit 34 and yield a cooled EGR output flow. The counterflow of the EGR cooler 38 is adapted to receive the diverted intake air or bleed air via bypass conduit 36. The cooled and compressed intake air is then heated by the hot EGR to produce heated intake air while simultaneously cooling the EGR flow through the EGR cooler 38. The heated intake air exiting from the EGR cooler 38 is combined with the exhaust gas remaining in the exhaust manifold 16 and used to drive the exhaust gas driven turbine 22 and associated compressor 24 thereby pressurizing the intake air approximate to the designed boost levels. As indicated above, the use of intake air to cool the EGR eliminates the need to use the engine coolant to absorb the heat from the recirculating exhaust gases and avoids pumping losses associated therewith.

Additional features of the illustrated embodiment of the EGR system include an exhaust particulate trap 39. The particulate trap 39, if used, is preferably disposed along the EGR conduit 34 upstream of the EGR cooler 38. Similarly, a regenerator device, generally known to those skilled in the art, could be used in lieu of the counterflow air to EGR heat exchanger to accomplish the transfer of heat from the recirculating exhaust gases to the cool, compressed intake air thereby cooling the EGR flow while concurrently heating the bypass air flow to recuperate some of the diverted exhaust flow used to drive the turbocharger.

In the embodiment illustrated in FIG. 1, the diverted exhaust gas is driven to the intake manifold 14 by the positive displacement pumping action of one or more designated cylinders. The complete diversion of exhaust gas from one or more combustion chambers to the EGR conduit 34 allows the EGR rate to be kept more or less constant without having to throttle the EGR diversion valves 40. In addition, since the exhaust gas diverted from the selected combustion chambers is typically pressurized above that of the exhaust manifold 16 and intake manifold 14, the EGR system 10 is adapted to operate within a broader range of engine operating conditions (i.e. at high load conditions). As indicated above, there exist some engine operating conditions, such as high load conditions, where the pressure differential between the intake manifold and the exhaust manifold essentially prevents many conventional EGR systems from being utilized without expensive and inefficient throttling arrangements in either the exhaust or intake manifolds.

One skilled in the art can appreciate and understand the preferred method of recirculating exhaust gas associated with the illustrated embodiment. Broadly speaking, the disclosed method of recirculating exhaust gas comprises the steps of: diverting a flow of exhaust gas from a selected number of combustion chambers; transporting the diverted exhaust gas to the intake manifold 14 or other location in the intake circuit downstream of the turbocharger via the EGR conduit 34; and replacing the diverted flow of exhaust gas in the exhaust manifold with a flow of replacement air, preferably by diverting a flow of cool intake air via a bypass conduit 36. The preferred method also includes cooling the recirculated exhaust gas in the EGR conduit 34 using the flow of diverted intake air and an EGR to intake air heat exchanger 46 thereby concurrently heating the intake air in the bypass conduit 36 using the recirculated exhaust gas. The heated intake air is fed to the exhaust manifold 16 where it is used to replace the recirculated exhaust gas. The heated intake air is combined with the remaining exhaust gas and used to drive the turbine 22 of the turbocharger 18.

Figure 2:
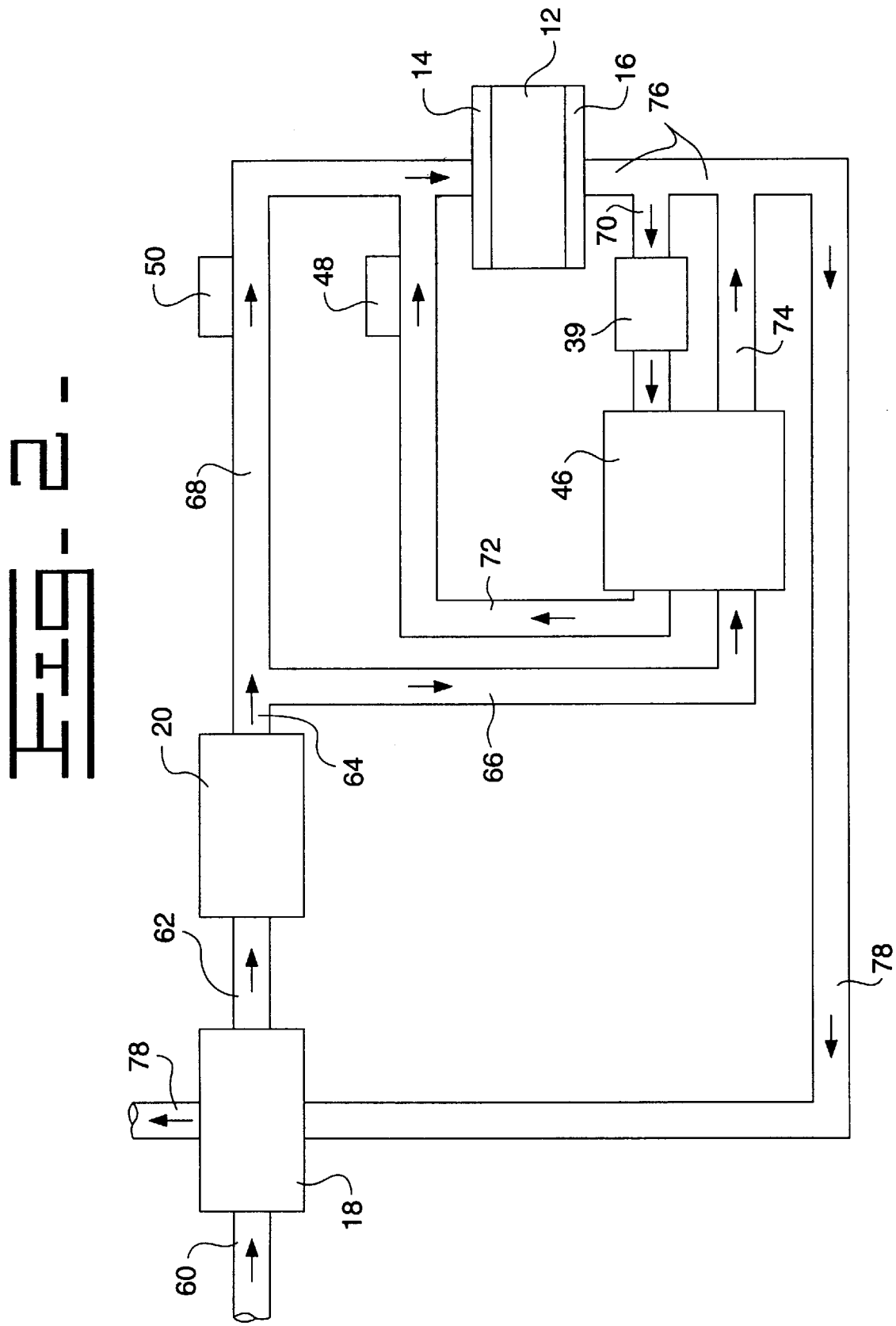
FIG. 2 is a functional block diagram of the exhaust gas recirculation (EGR) system of FIG. 1, generally depicting a detailed method for recirculating exhaust gas in a turbocharged diesel engine in accordance with the present invention.

Turning now to FIG. 2, there is shown a functional block diagram generally depicting a more detailed method for recirculating exhaust gas in a turbocharged diesel engine. It is important to note that while the description hereof is present in a sequential nature, many of the actual functions involved in the preferred process are performed concurrently, and not all steps are essential to the present method.

With the foregoing in mind, the depicted method involves the steps of: (a) receiving fresh intake air 60 at the turbocharger 18; (b) compressing the fresh intake air 60 with turbocharger 18; (c) sending the compressed intake air 62 to the air-to-air aftercooler 20; (d) cooling the compressed intake air 62 using the air-to-air aftercooler 20 to yield cooled compressed intake air 64; (e) diverting a selected volume 66 of the cooled compressed intake air 64; and (f) forwarding the remaining cooled compressed intake air 68 to the engine 12.

The preferred method also includes the steps of (g) diverting hot exhaust gas 70 from a selected number of combustion chambers of the engine 12; (h) cleansing the diverted hot exhaust gas 70 using a particulate trap 39; (i) cooling the diverted hot exhaust gas 70 to yield cooled exhaust gas 72 while concurrently heating the diverted volume of intake air 66 to yield heated intake air 74 using the heat exchanger 46; (j) combining the cooled exhaust gas 72 with the cooled compressed engine intake air 68 proximate the intake manifold 14; and (k) forwarding the combined intake EGR gas to the intake manifold 14 of the engine 12. Concurrently therewith the preferred method also includes: (l) replacing the hot exhaust gas 70 diverted from the exhaust manifold 16 with the heated intake air 74 and combining the heated intake air 74 with any remaining exhaust gas 76 to form a selected volume of discharge air 78; (m) driving an exhaust gas driven turbine 22 of the turbocharger 18 with the discharge air 78; and (n) forwarding the discharge air 78 to the exhaust system associated with the engine.

From the foregoing, it should be appreciated that the present invention thus provides a method and system for the recirculation of exhaust gas in a turbocharged diesel engine. While the invention herein disclosed has been described by means of specific embodiments and processes associated therewith, numerous modifications and variations can be made thereto by those skilled in the art without departing from the scope of the invention as set forth in the claims or sacrificing all its material advantages.

What is claimed is:

1. An exhaust gas recirculation system in a pressure-charged internal combustion engine, said pressure-charged internal combustion engine including an intake air circuit having an intake air pressurizing device, an intake manifold, an exhaust manifold, a plurality of combustion chambers, said exhaust gas recirculation system comprising:
   an exhaust gas recirculation conduit for diverting a flow of exhaust gas from at least one selected combustion chamber to said intake air circuit at a location downstream of said intake air pressurizing device;
   at least one exhaust gas recirculation diversion valve interposed between said selected combustion chamber and said exhaust gas recirculation conduit;
   a controller operatively associated with said exhaust gas recirculation diversion valve and adapted for selectively diverting said flow of exhaust gas from said selected combustion chamber to said exhaust gas recirculation conduit; and
   an intake air bypass conduit in fluid communication with said intake air circuit for selectively transporting a flow of intake air from said intake circuit to said exhaust manifold.

2. The exhaust gas recirculation system of claim 1 further including a particulate trap disposed in operative association with said exhaust gas recirculation conduit for cleansing said flow of recirculation exhaust gas in said exhaust gas recirculation conduit.

3. The exhaust gas recirculation system of claim 1, wherein said intake air bypass conduit being on fluid communication with said exhaust manifold proximate said selected combustion chamber.

4. The exhaust gas recirculation system of claim 3 further including an exhaust gas recirculation recuperator disposed in operative associaton with said intake air bypass conduit and adapted for heating said flow of intake air in said intake air bypass conduit wherein said heated flow of intake air replaces said recirculated exhaust gas in said exhaust manifold.

5. The exhaust gas recirculation system of claim 1 wherein said exhaust gas recirculation diversion valve is movable between a first position wherein said flow of exhaust gas from said selected combustion chamber is diverted to said exhaust gas recirculation conduit and a second position wherein said flow of exhaust gas from said selected combustion chamber is in flow communication with exhaust gas from other said plurality of combustion chambers in said exhaust manifold.

6. The exhaust gas recirculation system of claim 5 wherein said exhaust gas recirculation diversion valve is movable between said first position, said second position, and an intermediate position wherein a first portion of said flow of exhaust gas from said selected combustion chamber is diverted to said exhaust gas recirculation conduit and a remaining portion of said flow of exhaust gas from said selected combustion chamber is in flow communication with exhaust gas from other said plurality of combustion chambers in said exhaust manifold.

7. The exhaust gas recirculation system of claim 6 wherein said exhaust gas diversion valve is disposed in said exhaust manifold proximate to said combustion chamber.

8. The exhaust gas recirculation system of claim 1 further including an exhaust gas recirculation cooler disposed in operative association with said exhaust gas recirculation conduit and adapted for cooling said flow of recirculated exhaust gas in said exhaust gas recirculation conduit.

9. The exhaust gas recirculation system of claim 8 wherein said air intake pressurizing device includes a compressor and a gas driven turbine, said gas driven turbine adapted to receive exhaust gas from said exhaust manifold to drive said compressor thereby pressurizing said intake air in said intake circuit.

10. The exhaust gas recirculation system of claim 1 wherein said exhaust gas recirculation cooler is further adapted for heating said intake air in said intake air bypass conduit.

11. The exhaust gas recirculation system of claim 1 wherein said exhaust gas recirculation cooler is a heat exchanger for transferring heat from said recirculated exhaust gas to said flow of intake air in said intake air bypass conduit thereby cooling said recirculated exhaust gas and concurrently heating said flow of intake air in said intake air bypass conduit.

12. A method of recirculating exhaust gas in a pressure-charged internal combustion engine, said pressure-charged internal combustion engine including an intake air circuit with an intake air pressurizing device, said pressure-charged internal combustion engine further including an intake manifold, an exhaust manifold, and a plurality of combustion chambers, the method of recirculating exhaust gas comprising the steps of:
   (a) diverting a flow of exhaust gas from a selected number of combustion chambers to a recirculation conduit; and
   (b) transporting said diverted flow of exhaust gas in said recirculation conduit to said intake air circuit at a location downstream of said intake air pressurizing device; and
   (c) replacing said divert flow of exhaust gas with a flow of replacement air.

13. The method of recirculating exhaust gas as set forth in claim 12 wherein said step of replacing said diverted flow of exhaust gas is by diverting a flow of intake air to said exhaust manifold.

14. The method of recirculating exhaust gas as set forth in claim 13 further comprising the step of cooling said diverted flow of exhaust gas using said diverted flow of intake air.

15. The method of recirculating exhaust gas as set forth in claim 14 further comprising the step of cleansing said diverted flow of exhaust gas prior to said cooling step.

16. The method of recirculating exhaust gas as set forth in claim 14 further comprising the step of heating said diverted flow of intake air using said diverted flow of exhaust gas wherein the step of heating said diverted flow of intake air being concurrent with the step of cooling said diverted flow of exhaust gas.

17. The method of recirculating exhaust gas as set forth in claim 16 wherein said air intake pressurizing device includes an exhaust gas driven turbine, said method further includes the step of driving said turbine with any exhaust gas remaining in said exhaust manifold together with said diverted flow of intake air.

* * * * *

UNITED STATES PATENT AND TRADEMARK OFFICE
CERTIFICATE OF CORRECTION

PATENT NO. : 5,802,846
DATED : September 8, 1998
INVENTOR(S) : Brett M. Bailey

It is certified that error appears in the above-identified patent and that said Letters Patent is hereby corrected as shown below:

In Claim 12 (c), column 8, line 37 -- "divert flow" needs to read "diverted flow".

Signed and Sealed this

Thirteenth Day of July, 1999

Attest:

Q. TODD DICKINSON

*Attesting Officer*  *Acting Commissioner of Patents and Trademarks*